W. A. BARKER.
WATER CIRCULATION SYSTEM FOR SUBWAYS.
APPLICATION FILED FEB. 11, 1915.
1,144,094.
Patented June 22, 1915.
2 SHEETS—SHEET 2.
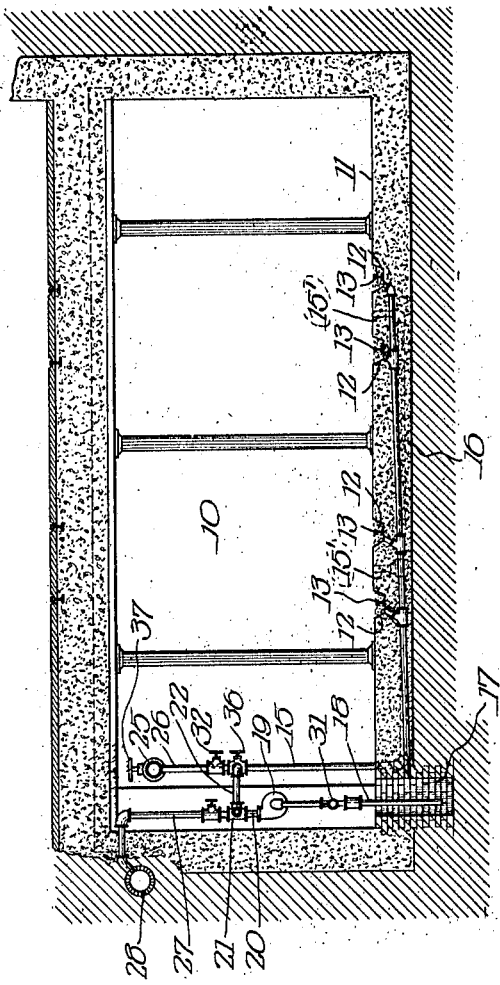
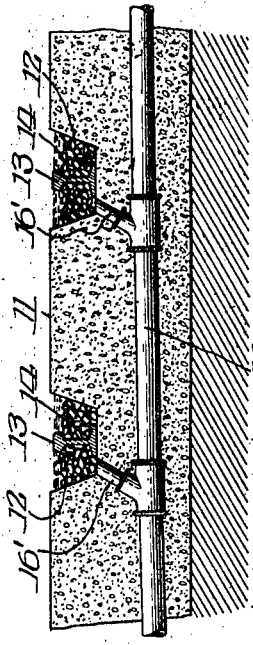
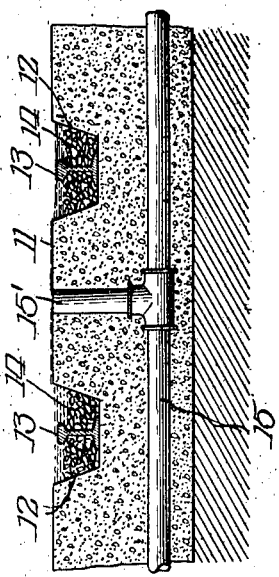
Witnesses:
Inventor:
Wendell A. Barker
By Pond & Wilson
Attys

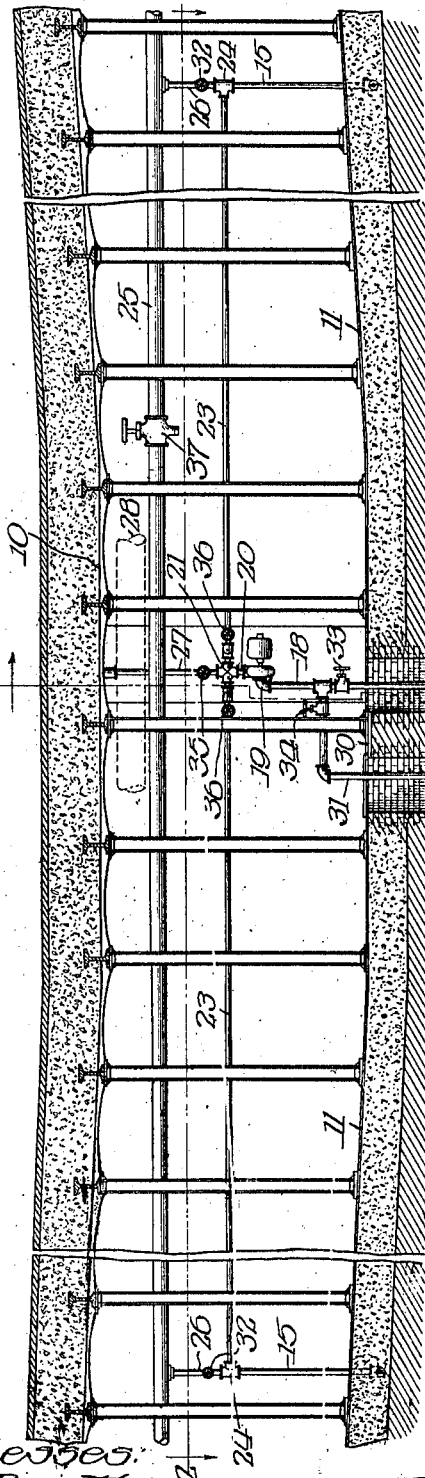

UNITED STATES PATENT OFFICE.

WENDELL A. BARKER, OF CHICAGO, ILLINOIS.

WATER-CIRCULATION SYSTEM FOR SUBWAYS.

1,144,094.  Specification of Letters Patent.  Patented June 22, 1915.

Application filed February 11, 1915. Serial No. 7,628.

*To all whom it may concern:*

Be it known that I, WENDELL A. BARKER, a citizen of the United States, residing at Chicago, in the county of Cook and State of Illinois, have invented certain new and useful Improvements in Water-Circulation Systems for Subways, of which the following is a specification.

This invention relates to an apparatus in the nature of a water circulation system designed for application to subways, tunnels, and the like, employed for transportation purposes through the agency of railway trains, and has for its main object to deaden sound, stop flying particles of dust, moisten and sweeten the atmosphere, cooling it in summer and warming it in winter, and to facilitate the washing of the walls and the floor of the subway when required and provide a ready means of protection against fire.

To this end the invention comprises essentially longitudinal troughs formed in or upon the inclined floor of the subway in which the track-rails are laid, and means for maintaining a slow circulation of water through said troughs, the water being maintained at a height at or slightly above the tread surface of the rails, such water circulation system comprising a return flow conduit that communicates with the track-troughs at relatively high and low points or levels of the latter, and a pump interposed in said return-flow conduit for maintaining a continuous slow circulation of the body of water through the latter and the troughs.

In order to maintain the comparative purity and cleanliness of the water supply used in the system, means are provided for discharging soiled or foul water from the system as it accumulates, and for introducing fresh clean water thereto to take its place. This latter means preferably comprises a sump or well interposed in the return-flow conduit, into which the water drains from the lowest point of the troughs, and from which, by means of suitable controlling valves, the water, when soiled or fouled may be discharged. Preferably, and as herein shown, I employ a clean water sump and a foul water or skimmer sump located alongside the clean water sump, with an overflow connection from the top of the latter into the top of the former to collect the skimmings from the clean water sump for periodical discharge as the skimmer sump becomes filled; this obviating the necessity of more frequent periodic discharges of the main or clear water sump.

My invention, its mode of operation, and the benefits and advantages secured thereby will all be readily understood when considered in connection with the accompanying drawings wherein I have illustrated one simple and practical embodiment of the invention, and in which,—

Figure 1 is a longitudinal section, broken out at both ends, through a subway or tunnel of the general character employed under the beds of rivers, having my invention applied thereto; Fig. 2 is a plan section on the line 2—2 of Fig. 1; Fig. 3 is a cross section on the line 3—3 of Fig. 1; Fig. 4 is an enlarged detail in cross section through the floor of the subway in the transverse plane of the water supply pipes at the high end of the track-troughs; Fig. 5 is a similar section in the plane of the drain pipes at the low end of the track-troughs.

Referring to the drawings, 10 designates as an entirety a subway or tunnel of the character usually employed beneath the bed of a river or stream, wherein the floor of the tunnel is lowest at or about its center and gradually inclines upwardly therefrom to both ends. The inclination of the floor is somewhat exaggerated in Fig. 1 in order to more clearly illustrate the mode of operation of the system. 11 designates the floor of the subway, in which are formed longitudinally extending troughs 12, in which are laid the track-rails 13; the troughs being preferably of such a depth that the upper surfaces of the treads of the rails are slightly below the tops of the troughs, so that, when the troughs are level full of water, the treads of the rails are slightly submerged.

As the floor of the subway is slightly inclined from each end downwardly to approximately the central point, it is manifest that water supplied to the troughs at the high end of the latter will flow down the latter to the lowest level; and in order to check or retard the rate of flow in cases where the degree of inclination may be considerable, I preferably provide in the troughs a flow-retarding agent which, in the instance shown, may comprise a body of cobble or crushed stone 14 (Figs. 4 and 5) filling the troughs to approximately the lowest side of the tread of the rails. The low and high points of the troughs are connected by a return-flow conduit which, in the instance shown, comprises the following: 15 designates a water supply pipe at each end, or other selected high point, the lower or horizontal bend of which is embedded in and transversely to the floor 11 (Fig. 4), and has a short vertical discharge nozzle 15' opening through the upper surface of the floor midway between the two rails of each track, so that the water emerging therefrom readily overflows into the troughs on each side. 16 designates a drain pipe (Fig. 5) similarly embedded in and transversely of the floor 11 at the center or other selected low point of the floor, said drain pipe communicating with the track-troughs through short lateral branches 16'. This drain pipe leads into a clear water sump 17 preferably located in the floor of the subway adjacent to one side wall thereof. The sump 17 is connected with the supply pipe 15 by a system of piping comprising, in the instance here shown, a vertical pipe section 18 rising from near the bottom of the sump 17, a rotary pump 19 connected on its suction side to the upper end of the pipe section 18, a short section 20 connected into the discharge side of the pump 19, an X coupling 21, a short lateral pipe section 22, and a longitudinal section 23 communicating with the supply pipe section 15 by a T coupling 24. 25 designates a water supply pipe extending lengthwise of the subway, preferably at an elevation somewhat higher than that of the pipe 23, and 26 designates a branch depending from the pipe 25 and forming a connection with the upper end of supply pipe 15 through the T coupling 24 for the admission of fresh water from the pipe 25 into the circulation system. With the upper end of the X coupling 21 communicates a pipe 27, which leads through the upper portion of the side wall of the subway into a sewer pipe indicated at 28. Alongside the main or clear water sump 17 is a foul water or skimmer sump 29 that communicates at its upper end with the clear water sump 17 through an overflow duct, indicated at 30. A branch pipe 31 leads from near the bottom of the skimmer sump 29 into the return-flow pipe section 18. A cock 32 in the branch pipe 26 governs the admission of fresh water into the circulation system; cocks 33 and 34 in the sump-delivery pipes 18 and 31, respectively, control the passage of water from the sumps, a cock 35 in the discharge pipe 27 controls the discharge of foul water through the latter to the sewer, and a cock 36 in the return-flow pipe section 23 controls the flow of water through the latter. In the normal operation of the system, cocks 32, 34 and 35 are closed and cocks 33 and 36 are open. The operation of the pump 19, under these conditions, maintains a continuous circulation through the track-troughs and the return-flow conduit including the sump 17. When an accumulation of foul water, representing the skimmings from the sump 17 is to be discharged from the sump 29, the cocks 33 and 36 are closed and the cocks 34 and 35 are opened, thus draining the sump 29. Occasionally it is desirable to empty and clean the sump 17, and this is done by closing the cock 36 and opening the cock 35; the system being then filled by opening the cock 32.

From the foregoing description of the operation of the system it is believed that the manner in which the stated advantages thereof are secured will be readily seen. As the tracks are submerged in water there is no dust from the roadbed to be stirred up and scattered through the atmosphere of the subway, the presence of the water moistens the atmosphere to a desirable extent and moderates the temperature in a desirable manner, both in extreme cold and extreme hot periods, and the submerging of the track rails very largely deadens the roar of the trains traveling at high speed over the latter.

At 37 I have indicated a hydrant connection on the water supply pipe 25 for a hose that may be used in washing down the walls and floor of the tunnel, or in extinguishing fires, or for any other desirable purpose.

Without limiting myself to the specific detail structure and arrangement of the parts described, which may be considerably varied within the purview of the invention without involving any departure from the principle thereof or any lessening of the advantages secured thereby, I claim:

1. In a water circulation system for subways, the combination with an inclined floor of a subway, of track-troughs carried thereby, track-rails in said troughs, a return-flow water conduit communicating at its ends with relatively low and high points of said track-troughs, respectively, and a water circulation pump located in said return-flow conduit.

2. In a water circulation system for subways, the combination with an inclined floor of a subway, of track-troughs carried thereby, track-rails in said troughs, a return-flow water conduit communicating at its ends with relatively low and high points of said track-troughs, respectively, a water circulation pump located in said return-flow conduit, means for collecting and discharging foul water from said system, and means for admitting fresh water thereto when required.

3. In a water circulation system for subways, the combination with an inclined floor of a subway, of track-troughs carried thereby, track-rails laid in said troughs, a return-flow water conduit communicating at its ends with relatively low and high points of said track-troughs, respectively, a flow-retarding agent in said track-troughs, and a water circulation pump located in said return-flow conduit.

4. In a water circulation system for subways, the combination with an inclined floor of a subway, of track-troughs carried thereby, track-rails laid in said troughs, a return-flow water conduit comprising a pipe for supplying water to said troughs at a relatively high point of the latter, a drain pipe communicating with said troughs at a relatively low point of the latter, a sump into which said drain pipe discharges, and a pipe connecting said sump with said supply pipe, and a water circulation pump located in one of said pipes.

5. In a water circulation system for subways, the combination with an inclined floor of a subway, of track-troughs carried thereby, track-rails laid in said troughs, a return-flow water conduit comprising a pipe for supplying water to said troughs at a relatively high point of the latter, a drain pipe communicating with said troughs at a relatively low point of the latter, a sump into which said drain pipe discharges, and a pipe connecting said sump with said supply pipe, a water circulation pump in said connecting pipe, a fresh water admission pipe connected to said supply pipe, a foul water discharge pipe connected to said connecting pipe on the discharge side of said pump, and suitable valves governing the flow of water through pipes, troughs, and sump.

6. In a water circulation system for subways, the combination with an inclined floor of a subway, of track-troughs carried thereby, track-rails laid in said troughs, a return-flow water conduit comprising a pipe for supplying water to said troughs, at a relatively high point of the latter, a drain pipe communicating with said troughs at a relatively low point of the latter, a clear water sump into which said drain pipe discharges, and a pipe connecting said clear water sump with said supply pipe, a water circulation pump in said connecting pipe, a skimmer sump located adjacent to said clear water sump, an overflow duct for the skimmings from said clear water sump into said skimmer sump, a pipe connecting said skimmer sump with said connecting pipe on the suction side of said pump, a foul water discharge pipe connected to said connecting pipe on the discharge side of said pump, and suitable valves governing the flow of water through said pipes, troughs and sumps.

WENDELL A. BARKER.

Witnesses:
S. N. POND,
A. G. LATIMER.